United States Patent
Satran et al.

(10) Patent No.: US 6,507,586 B1
(45) Date of Patent: Jan. 14, 2003

(54) MULTICAST DATA TRANSMISSION OVER A ONE-WAY BROADBAND CHANNEL

(75) Inventors: Julian Satran, Haifa (IL); Efraim Zeidner, Palo Alto, CA (US); Benny Rochwerger, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/138,994

(22) Filed: Aug. 24, 1998

(30) Foreign Application Priority Data

Sep. 18, 1997 (EP) .............................. 97480064

(51) Int. Cl.[7] .................................................. H04J 3/26
(52) U.S. Cl. ........................................ 370/432; 370/474
(58) Field of Search ................................ 370/389, 390, 370/392, 394, 395.2, 395.4, 395.3, 395.31, 395.32, 432, 465, 470, 471, 473, 494

(56) References Cited

U.S. PATENT DOCUMENTS

| | | | | |
|---|---|---|---|---|
| 5,652,749 A | * | 7/1997 | Davenport et al. | 370/466 |
| 5,930,259 A | * | 7/1999 | Katsube et al. | 370/409 |
| 6,247,059 B1 | * | 6/2001 | Johnson et al. | 709/237 |

* cited by examiner

*Primary Examiner*—Kwang Bin Yao
(74) *Attorney, Agent, or Firm*—Scott W. Reid

(57) ABSTRACT

Data transmission system comprising a single transmitter and a plurality of receivers and in which the transmitter sends a group Gi of data items to the plurality of receivers over a one-way channel, wherein each data item to be transmitted is divided in blocks which are encapsulated to form datagrams, each datagram including a block sequence number, a data item identifier, a timestamp reflecting the age of the data item, and a group directory GD is regularly sent by the transmitter) to each one of the plurality of receivers, the group directory containing information for all groups Gi of data items being sent enabling each one of the plurality of receivers to select the group of data items it wants to receive.

10 Claims, 2 Drawing Sheets

MULTICAST DATA TRANSMISSION OVER A ONE-WAY BROADBAND CHANNEL

TECHNICAL FIELD OF THE INVENTION

The present invention relates to systems for delivery of data over one-way broadband networks such as cable TV and satellite and, in particular, to a method for transmitting multicast data over a one-way channel of an existing broadband network infrastructure.

BACKGROUND ART

In a push model for distributing data, a server "broadcasts" the same data to many listeners. To avoid wasting bandwidth, instead of sending the data separately to each listener, it can be sent to a "multicast group". Anyone interested in receiving the data becomes a listener by joining the group. As the push model becomes more common, the question of what should be the underlying infrastructure, is raised.

By their nature, "push applications" are closer to the broadcasting paradigm of radio and television than to the interactive paradigm of the World Wide Web. As such, broadband networks, such as cable TV or satellite, could be used as a very efficient medium for the transmission of "pushed data". However, these networks are one-way only, i.e. data (such as a television signal) is sent from a broadcasting facility (the head-end) to several receivers (the end-users) without any feedback from the receivers. Although attempts to upgrade the current infrastructure are underway in several places around the world, it may be years until reliable two-way broadband networks are commonplace. Therefore, an effective mechanism for multicasting over one-way broadband networks is desirable.

Commonplace TCP/IP applications, like Telnet and Web browsing, usually involve one sender and one receiver. Even in those applications where the same data is sent to several receivers by a single sender, distribution is accomplished by sending a different copy of the same data to each receiver.

IP multicasting was conceived to improve bandwidth usage in such cases. Instead of sending several copies of the same data, only one copy is sent to a "group of receivers". Each such multicast group is assigned a class D IP address which is used as the destination address for all datagrams destined to any of the group's members. A host that wants to receive a group joins the group by adding its address to the list of IP local addresses, and stops reception by leaving the group, i.e., removing its address from the list. Hosts join and leave groups by sending Internet Group Management Protocol (IGMP) messages to the all-hosts group. Routers listen to the all-hosts group and update their internal group membership tables according to the IGMP messages they receive.

By default, multicast datagrams are assigned a time-to-live (TTL) field of 1, i.e., they are restricted to the same subnet as the sender. However, an application is allowed to set the TTL field to a higher value so its datagrams can reach hosts beyond the local subnet. Multicast routers is keep track of joined hosts per group. If a multicast datagram with a TTL greater than 1 arrives at such a router and any host on any of the routers subnets is a member of the datagram's destination group, then the message is forwarded (after decreasing the TTL field value) to the appropriate subnet(s).

Addresses in a specific range are intended for applications that never need to multicast more than one hop. A datagram destined for any address within the specific range is never forwarded, regardless of the TTL field value.

In the IP multicasting technique, there is no guarantee that a datagram will ever reach its destination. Consequently, if reliability is an issue, multicast applications must provide it themselves. The current approaches to error recovery are NAK-based (requesting missed data) or ACK-based (acknowledgement of each datagram received). Both approaches assume that there is a link from the multicast receivers to the multicast source.

Although hybrid systems for IP over broadband networks offer an attractive alternative for Internet access, they still suffer from some of the same problems as telephony-based systems (the need to establish a connection and extended use of the telephone line). For interactive applications there is not much that can be done to overcome these limitations until two-way broadband networks are deployed.

SUMMARY OF THE INVENTION

A main object of the invention to provide a new concept of "pushing" data over the existing broadband network infrastructure.

Another object of the invention is to provide a system for IP multicasting over the existing broadband networks without using any return link.

Another object of the invention is to provide a unique system for IP multicasting over a one-way channel wherein problems of multicast group membership as well as error recovery are handled locally within an end-user terminal removing any need for returning data to a host.

The invention relates to a data transmission system having a single transmitter and a plurality of receivers where the transmitter sends a group of data items to a subset of receivers over a one-way channel. Each data item is divided in blocks which are encapsulated to form datagrams, each including a block sequence number, a data item identifier, a timestamp reflecting the age of the data item. A group directory is regularly sent by the transmitter to each one of the plurality of receivers. The group directory contains information for all groups of data items enabling each receiver to select the group of data items it wants to receive.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description which read in conjunction with the accompanying drawings wherein:

DETAILED DESCRIPTION OF THE INVENTION

Figure 1:
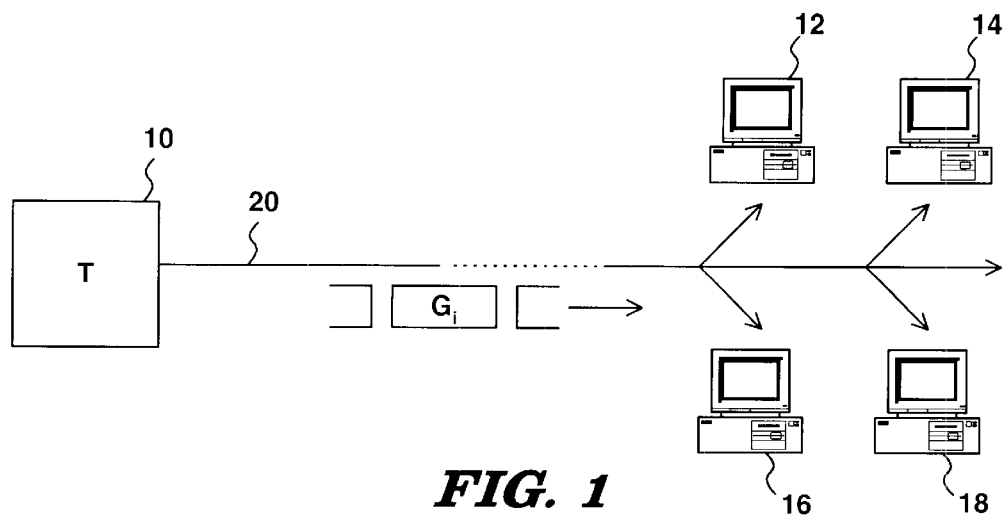
FIG. 1 is a schematic representation of a multicast network implemented in accordance with the present invention.

A data transmission system according to the invention includes a broadband multicast transmitter 10, and multiple broadband multicast receivers (end users) 12, 14, 16, 18, connected through a one-way distribution media 20 as illustrated in FIG. 1. Distribution media 20 is capable of transmitting data at rates in the range of 500 Kbits/s to 51 Mbits/s for TV cable systems and 48 Mbits/s for satellite systems.

At the transmitting end of the system, transmitter 10 generates local multicast data as groups Gi and routes this data into the broadband network. Each group is composed of data corresponding to some application specific criteria. Data dependencies, if any, will be reflected in the data update order.

Before transmission, the data is broken into blocks which are encapsulated to form fixed length datagrams which are periodically sent over the broadband network. Datagram transmission is needed so that a multicast receiver can access the data at its own convenience and not according to a predetermined schedule and so that a receiver which misses a block can wait for the next transmission to get it.

At the receiving end, the broadband multicast receivers reconstruct the original data and detect missing blocks. To avoid receiving repeated data, receivers can "join" and "leave" groups as the transmitted data changes. A receiver joins or leaves a group by using an IP multicast protocol which is not the subject of the present invention.

The data rate on the media is not a specific feature of the invention. It can vary in a range from some hundreds of Kbits/s to more than 150 Mbits/s with current technologies, and perhaps to several hundreds of Mbits/s in the future.

Data Model

In a preferred embodiment of the invention, a group Gi of data transmitted over a one-way channel is a collection of one or more data items $$Gi = \bigcup_{j=ni}^{Ni} Iij$$

wherein $n_i \geq 1$ and $N_i \geq 1$

Thus, a group Gi can contain: a single data item if $n_i = N_i = 1$; a FIFO fixed length collection of data $N_i - n_i$ data items (whenever a new item is added, the oldest item is removed) or a growing collection of data items if $n_i = 1$ and $N_i$ is incremented every time a new item is added.

Each data item $I_{ij}$ is made out of one or more concatenated datagrams $$I_{ij} = \sum_{k=1}^{mij} bijk$$

For example, $I_{i1} = b_{i11}, b_{i12} \ldots b_{i1mil}$.

Thus, data is transmitted sequentially and periodically according to the following sequence (assuming that $n_i = 1$)

... $I_{i1}$ $I_{i2}$ ... $I_{iNi}I_{i1}$ ... Gi

Therefore, over each one-way channel, data is arranged in a kind of "carousel" the size of which depends upon the number and length of the data items included in group Gi. Clearly, the minimum frequency is determined by the size of the carousel. Note that, the smaller the carousel, the frequently it may be updated.

Figure 2:
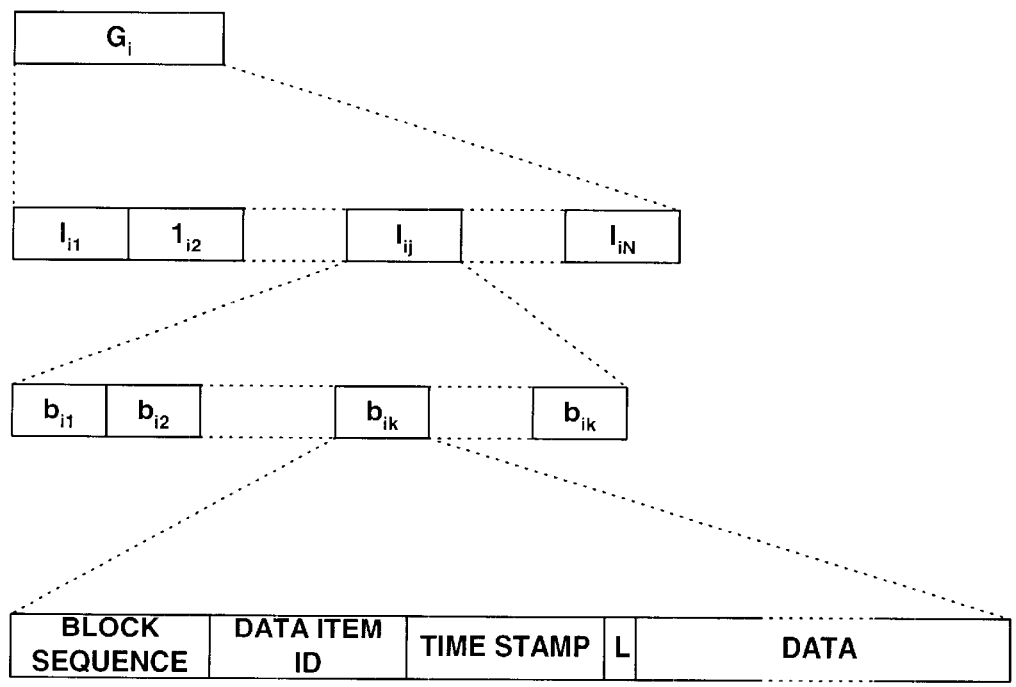
FIG. 2 is a block diagram showing the relationship between data groups, data items, datagrams and datagram fields.

As illustrated in FIG. 2, in a preferred embodiment, each data block is encapsulated with at least the following information:

the block sequence number k;

the identifier ID of the corresponding data item;

the timestamp of the corresponding data item which reflects the age of this data item; and the total number L of blocks in the corresponding data item or an indication of whether or not the block is the last one.

The blocks are not timestamped separately from the data item, but each group is timestamped to reflect that one of its data items has been updated.

Also, since blocks of different groups are sent to different multicast addresses i corresponding to different channels, it is not necessary to transmit an identifier of the corresponding group Gi with each block.

Group Directory

The heart of the system is a Group Directory (GD) which is constantly sent by the multicast transmitter over the all-hosts group. Multicast receivers check this directory regularly and use the information in it to select "interesting groups". Decisions as to whether to join or leave a group are made entirely within the receivers, i.e. the multicast transmitter is ignorant of group membership. If desired, group membership can b restricted by encrypting the information on the group directory or/and using the techniques used on the cable TV industry for limiting access to premium channels.

For each group Gi, the directory contains at least the following:

the group's multicast address (i) and the group's assigned port;

the range of data items in the group ($[n_i \ldots N_i]$);

the group's timestamp (Timestamp(Gi)); and information (such as keywords) related the group contents.

This information can be used by the receiver to select interesting groups. Note that data in a group is simultaneously utilized only by receivers which have joined the group.

For efficiency, the directory itself is timestamped to reflect the "age" of the youngest group in the directory, i.e.

Timestamp(GD) $\geq$ Timestamp($GD_i$)

where $GD_i$ is the directory entry for group Gi, and GD represents the entire directory.

The set of groups that the receivers may join is limited to those groups in the Group Directory.

Broadband Multicast Transmitter

The broadband multicast transmitter is preferably a multi-threaded application running in a data processing system at the head-end or transmitter. The broadband multicast transmitter is responsible for periodically sending the Group Directory as well as the data in all the groups in the Group Directory. Each group is assigned to a Group Sending Thread (GST) which collects the group's data, partitions it into data blocks and sends those blocks as UDP (User Datagrarn Protocol) datagrams with the group's multicast address as the destination address. Additionally, the Directory Sending Thread (DST) periodically sends the Group Directory as a single UDP datagram to the all-hosts group.

The process of breaking data into blocks and encapsulating it may be time-consuming. To minimize the burden, GSTs keep a "compiled" copy of the last updated data (Gi). The thread goes through the process of "compiling" the data only when a modified or new data item is identified (Timestamp($I_{ij}$)≦Timestamp(Gi).

The following pseudo-code illustrates the process relative to the GST, thread.

```
Forever(
    // Update Group Data:
    for(j = n_i; j ≤ N_i; j++)(
        if(Timestamp(Gi) < Timestamp(I_ij))(
            Lock(I_ij);
            UpdateItem(Gi, I_ij);
            Unlock(I_ij);
        )
    )
    // Update Local Group Directory:
    if(Timestamp(GD^L) < Timestamp(Gi))(
        Lock(GD^L);
        UpdateEntry(GD^L, Gi);
        Unlock(GD^L);
        WaitForNotification(GDSent);
    )
    // Send Group's Data:
    Send(Gi),
    SleepAWhile(GSTDelay);
)
```

This means that, if new data is identified, it is prepared and the appropriate $GD^L$ entry is updated. Once modified, Gi is not sent until the updated $GD^T$ has been sent. If nothing changes, Gi is sent periodically without compiling again.

Similarly, the DST keeps two copies of the group directory: one copy for periodic transmission ($GD^T$), and a local copy (GD) for updates by the GSTs. Whenever the two GDs disagree, $GD^T$ is updated by the DST.

The following pseudo-code illustrates the process relative to the DST thread.

```
Forever(
    if(Timestamp(GD^T) < Timestamp(GD^L))(
        Lock(GD^L);
        UpdateDirectory(GD^T, GD^L);
        Unlock(GD^L);
        Send(GD^T);
        NotifyAll(GDSent);
    )
    else Send(GD^T);
    SleepForAWhile(DSTDelay);
)
```

This means that, when the timestamps of the two copies of the GD do not match, $GD^T$ is updated and, after it has been sent, all GSTs are notified. If nothing changes $GD^T$ is sent periodically.

Note that a process for the evolution of data items (changes over time) is not specified here. Clearly, this depends on each application. However, it should be noted that a synchronization mechanism should be implemented between the application that changes the data and the appropriate group sending thread. Some important aspects of the behavior of the multicast transmitter are apparent from the above pseudo-code:

write access to $GD^L$ is mutually exclusive;

read access to $GD^L$ is not protected, hence an older$^T$ GD might be send, but the Wait For Notification/Notify All mechanism assures that data sent is always in synchronism with the latest directory sent;

when a change is identified by a GST, the timestamp of the whole $GD^L$ is updated. By doing so, the timestamp of the directory is assured to be equal or greater than the timestamp of any of the entries (as required);

Broadband Multicast Receiver

The Broadband Multicast Receiver is responsible for retrieving from the broadband network the data of "interesting" groups. Preferably, the receiver is implemented as an application for a general purpose data processing system. Note that it is entirely up to the user to decide what constitutes an interesting group. Applications may provide a subscription mechanism for selecting such groups.

The Directory Receive Thread (DRT) is responsible for periodically retrieving the most-up-to-date group directory ($GD^R$) from the all-hosts group. If any entry in $GD^R$ is newer than the corresponding entry in the local version of the group directory ($GD^L$), then the corresponding Group Receive Thread (GRT) is notified to start retrieving its data. The pseudo-code for the DRT thread can be as follows:

```
JoinLocalGroup(all-hosts);
forever(
    GD^R ← ReceiveGroupData(all-hosts);
    if(Timestamp(GD^L) < Timestamp(GD^R))(
        for each i in ListOfInterestingGroups(
            if(Timestamp(GDi^L) < Timestamp(GDi^R))(
                Notify(GRT_i, NewData);
            )
        )
        UpdateDirectory(GD^L, GD^R);
    )
)
```

This means that if the timestamp of the received group directory ($GD^R$) is newer than the one of the local copy of the directory ($GD^L$), then, DRT finds all the entries in $GD^R$ that have changes and notifies the appropriate GRTs.

Once a GRT receives a notification from the DRT, it joins the appropriate group (Gi) and enters into the data reconstruction loop where it starts retrieving data. The following pseudo-code illustrates such a process.

```
Forever(
    WaitForNotification(NewData);
    joinLocalGroup(Gi);
    while still missing blocks(
        // Receive block
        b_ijk ← ReceiveGroupData(Gi);
        // Check for changes on the transmitted data item
        if(Timestamp(I_ij) < Timestamp(b_ijk))(
            RemoveAllBlocksFromDataItem(I_ijk);
        )
        // Handle block
        if(b_ijk is not in I_ij)(
            Add Block(I_ij, b_ijk);
            -----------------------------------------------
            // Optionally, fix errors
            if(b_ijk is out of sequence)(
                Notify(DelayedGroup, Newdata);
            -----------------------------------------------
        )
    )
    leaveLocalGroup(Gi);
)
```

This means that after notification of new data is received, the thread joins the appropriate group (Gi), and starts retrieving blocks. Blocks are not only retrieved but also used for checking consistency (timestamps check), and optionally, for error detection (dashed box).

Each received block is checked against the received data. If the block timestamp doesn't match the local data timestamp, then, the data item itself has changed and all blocks previously retrieved are ignored. If the block is not already in the data, then, the block is processed (decapsulated) and, using its sequence number, is added to the appropriate place in the data. Optionally, the block sequence number can be used to detect missed blocks (assuming continuity) permitting an appropriate correction mechanism to be started.

Once all the data have been retrieved, GRTi leaves the group. Note that in the receiving side there is no locking at all. This is possible because blocks are also timestamped, and that is the only information that could have been "shared" between GRTs and the DRT.

Error Recovery

Where reliability is provided by periodic retransmission of missing data, this system requires bandwidth and therefore, should be used only on groups where data reliability is essential (file transfers). The system is not well suited for groups where losing some data blocks is not a major problem (real-time multimedia streams).

The following additions can be made to the proposed protocol to support non-reliable groups:

transmission start ($T_{start}$) and transmission end ($T_{end}$) times can be assigned to the group and made part of the group's GD entry;

DST delays can be made known to the appropriate GST to give end-user the opportunity to join groups before $T_{start}$; and, GRT leaves the group a short time after $T_{end}$.

Performance vs. Bandwidth Conservation

In the present invention, error recovery is based on retransmission. But the probability of error (losing a block) grows linearly with the size of the data. Multiple multicast groups with delayed replication can be used to avoid this problem and to improve performance. The same data (a) can be assigned to several groups G for r ∈ [0 . . . n]. The transmission of each group would be "shifted" by some delay $T_d$, i.e. the transmission start time $T_{start}$ of the appropriate group sending threads may be given by:

$$\forall r \in [1 \ldots n]: T_{start}(GST) \geq T_{start}(GST) + r \times T_d.$$

When a receiving thread GRT notices that a block has been lost (blocks should arrive sequentially), it notifies an auxiliary thread GRT that retrieves from the delayed group the missing data. Once the missing data has been retrieved GRT leaves its group and goes back to sleep. The delay $T_d$ should be large enough so the receiving thread will have time to realize that something is missing and set up the auxiliary thread, before the missing data is sent(otherwise GRT will miss it too).

Assuming that while receiving G data, block $b_{n-1}$ got lost. Without delayed replication, GRT will need to wait until $t_{2n-1}$ to get the missing block. With delayed replication, the auxiliary thread GRT will be able to retrieve $b_{n-1}$ by $t_{n+2}$. The choice of the delay $T_d$ is very important for optimized results. Only by $T_n$, GRT realizes that there is a block missing. It then needs some time to set up GRT, so the earliest $b_{n-1}$ can be retrieved is $t_{n-1}$, i.e. any smaller $T_d$ will not help.

Figure 3:
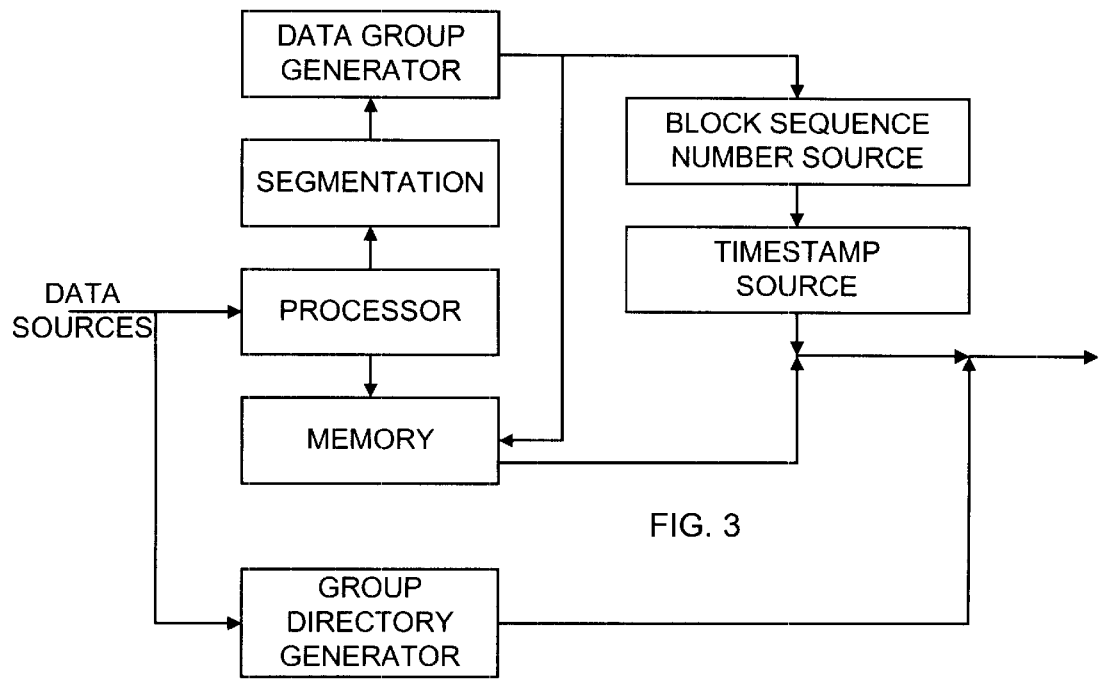
FIG. 3 is a schematic representation of functional elements of a transmitter for implementing the present invention.
Figure 4:
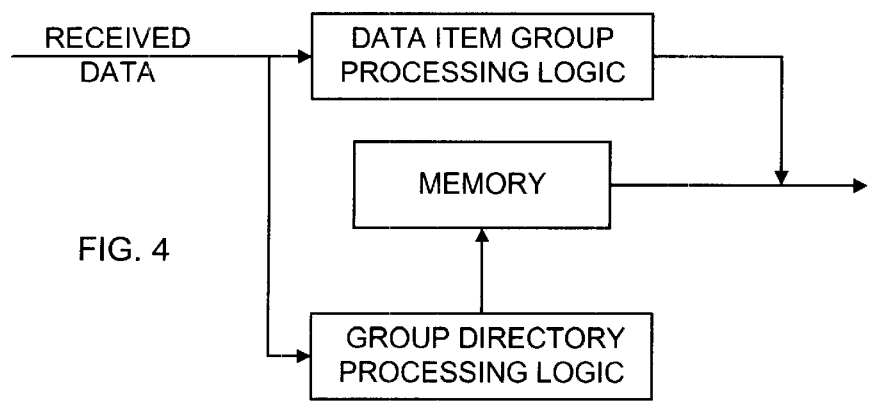
FIG. 4 is a schematic representation of functional elements of a receiver for use in a system implementing the present invention.

As noted earlier, the invention is preferably implemented through programming of generatl purpose data processing systems. It is well within the scope of the invention to implement the invention in a hybrid system, one in which some functions are implemented as programming instructions while other functions are implemented using special purpose hardware elements. FIG. 3 is a block diagram representation of functional elements of a transmitter for use in implementing the invention. As a matter of convenience or for system performance reasons, a number of the functions shown there, all described in detail above, might be implemented as ASICs (Application Specific Integrated Circuits) or other hardware elements. Similarly, FIG. 4 shows the major functional elements of a receiver suitable for use in a system implementing the present invention. The logic functions shown there, also as described in detail earlier, could similarly be implemented in special purpose hardware elements or as a mix of special purpose hardware and programming.

There has been described what is considered to be a preferred embodiment of the invention. However, variations and modifications in the invention will occur to those skilled in the art once they become familiar with the preferred embodiment. Therefore, it is intended that the following claims shall be construed to include both the preferred embodiment and all variations and modifications thereof as fall within the true spirit and scope of the invention.

What is claimed is:

1. For use in a multicast data transmission system in which a single transmitter distributes data to a plurality of receivers, a data distribution system in which data is distributed in a format which enables each receiver to determine whether to utilize the distributed data, said system comprising:

a datagram generator which segments data items to be transmitted into datagrams and adds a block sequence number, a data item identifier and a timestamp reflecting the age of the data item to each datagram;

a data group generator which creates groups of data items to be distributed; and a group directory generator which creates a group directory, each said group directory containing information about group contents which enables a receiver to determine which of the distributed groups of data items it wishes to utilize.

2. A system as set forth in claim 1 further including means for periodically sending generated groups of data and group directories to the plurality of receivers.

3. A system as set forth in claim 2 wherein said data group generator maintains a transmission-ready copy of the most recent form of each each group and creates a new transmission-ready copy only when at least one of the data items in the group has changed.

4. A system as set forth in either of claims 2 or 3 wherein the group directory includes a group multicast address, a range of data items in the group, a group timestamp and information specifically related to the contents of one or more of the data items in the group.

5. A system as set forth in claim 4 wherein the group directory generator sets a group timestamp to the timestamp of the newest data item in the group.

6. For use in a multicast data transmission system in which a single transmitter distributes data to a plurality of receivers, a method of distributing data in a format which enables each receiver to determine whether to utilize the distributed data, said method comprising the steps of:

segmenting data items to be transmitted into datagrams;

adding a block sequence number, a data item identifier and a timestamp reflecting the age of the data item to each datagram;

combining one or more of said datagrams into a group of data items to be distributed; and generating a group directory, each said group directory containing information about group contents which enables a receiver to determine which of the distributed groups of data items it wishes to utilize.

7. A method as set forth in claim 6 further including the steps of periodically transmitting each the groups of data items and each of the group directories to the plurality of receivers.

8. A method as set forth in claim 7 further including the steps of:

maintaining a copy of the most recently transmitted version of each group in compiled format;

determining whether the contents of the group have changed since the most recent transmission of the group;

creating a new version of a group only in compiled format only when the group contents are determined to have been changed since the most recent transmission.

9. A method as set forth in either of claims 7 or 8 where each generated group directory includes a group multicast address, a range of data items in the group, a group timestamp and information specifically related to the contents of one or more of the data items in the group.

10. For use in a multicast data transmission system in which a single transmitter distributes data to a plurality of receivers, said transmitter comprising a data distribution system having a datagram generator which segments data items to be transmitted into datagrams and adds a block sequence number, a data item identifier and a timestamp reflecting the age of the data item to each datagram; a data group generator which creates groups of data items to be distributed and a group directory generator which creates a group directory, each said group directory containing information about group contents, a receiver comprising:

a memory for storing received data item groups;

means for receiving data item groups and group directories transmitted periodically by the data distribution system at the transmitter;

means for processing group directory information to determine whether the most recently received information in a group is different from information already stored in said memory for said group;

logic for processing the most recently received version of the group only where a difference is detected.

* * * * *